US012069557B2

(12) United States Patent
Chelminski et al.

(10) Patent No.: US 12,069,557 B2
(45) Date of Patent: Aug. 20, 2024

(54) MOBILE MESH NETWORK PROVISIONING SYSTEMS AND METHODS

(71) Applicant: Lyft, Inc., San Francisco, CA (US)

(72) Inventors: Richard Steven Chelminski, Oakland, CA (US); Jatin Chopra, San Francisco, CA (US); Romain Clément, Campbell, CA (US); Cyril Francis Meyer, III, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 831 days.

(21) Appl. No.: 16/716,375

(22) Filed: Dec. 16, 2019

(65) Prior Publication Data

US 2021/0185587 A1    Jun. 17, 2021

(51) Int. Cl.
| | |
|---|---|
| *H04W 40/12* | (2009.01) |
| *H04L 67/104* | (2022.01) |
| *H04W 4/46* | (2018.01) |
| *H04W 40/24* | (2009.01) |
| *H04W 40/28* | (2009.01) |
| *G08G 1/00* | (2006.01) |
| *H04W 84/18* | (2009.01) |

(52) U.S. Cl.
CPC ......... *H04W 40/12* (2013.01); *H04L 67/1046* (2013.01); *H04W 4/46* (2018.02); *H04W 40/246* (2013.01); *H04W 40/28* (2013.01); *G08G 1/20* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,736,618 | B1* | 8/2017 | Haney | H04W 12/06 |
| 9,769,616 | B1* | 9/2017 | Pao | H04W 4/023 |
| 2005/0152318 | A1* | 7/2005 | Elbatt | H04W 4/00 370/338 |
| 2006/0002332 | A1* | 1/2006 | Diaz Cervera | H04W 88/04 370/328 |
| 2010/0157889 | A1* | 6/2010 | Aggarwal | H04L 45/48 370/328 |
| 2011/0040878 | A1* | 2/2011 | Luzzatti | H04L 67/104 709/228 |
| 2011/0225312 | A1* | 9/2011 | Liu | H04N 21/632 709/231 |
| 2013/0094398 | A1* | 4/2013 | Das | H04W 40/06 370/254 |

(Continued)

*Primary Examiner* — Nicholas Sloms
(74) *Attorney, Agent, or Firm* — Baker Botts L.L.P.

(57) ABSTRACT

Techniques are disclosed for systems and methods to provision a mobile mesh network. A mobile mesh network provisioning system includes a wireless communications module configured to be physically coupled to a fleet vehicle and to form at least a part of a mobile mesh network including a plurality of mobile nodes corresponding to a respective plurality of fleet vehicles, and a logic device configured to communicate with the wireless communications module. The logic device is configured to determine a data route through at least a portion of the mobile mesh network based, at least in part, on a target data destination and a mobile node participation variability associated with the mobile mesh network, and to transmit fleet data associated with the fleet vehicle along the determined data route.

20 Claims, 8 Drawing Sheets

(56) References Cited

U.S. PATENT DOCUMENTS

| | | | |
|---|---|---|---|
| 2016/0027306 A1* | 1/2016 | Lambert | G06Q 10/06315 |
| | | | 701/117 |
| 2016/0034828 A1* | 2/2016 | Sarawgi | G06Q 10/00 |
| | | | 705/5 |
| 2017/0048785 A1* | 2/2017 | Ge | H04W 48/02 |
| 2017/0238346 A1* | 8/2017 | Egner | A61B 5/14503 |
| | | | 370/338 |
| 2017/0339510 A1* | 11/2017 | Condeixa | H04W 4/40 |
| 2018/0096445 A1* | 4/2018 | Eyler | G06Q 50/30 |
| 2018/0137373 A1* | 5/2018 | Rasmusson, Jr. | G06V 20/56 |
| 2018/0308191 A1* | 10/2018 | Matthiesen | G06Q 10/06315 |
| 2018/0328748 A1* | 11/2018 | Chachra | G06Q 50/30 |
| 2018/0334216 A1* | 11/2018 | Montez | B62J 50/225 |
| 2019/0019114 A1* | 1/2019 | Medvedovskiy | G06Q 30/0645 |
| 2019/0025856 A1* | 1/2019 | Turato | B60W 10/06 |
| 2019/0071143 A1* | 3/2019 | Wu | G06Q 30/0645 |
| 2019/0132722 A1* | 5/2019 | Bansal | H04W 8/005 |
| 2019/0250619 A1* | 8/2019 | Gillett | B62K 23/02 |
| 2019/0349426 A1* | 11/2019 | Smith | H04L 45/20 |
| 2020/0008122 A1* | 1/2020 | Radko | H04W 36/32 |
| 2021/0114616 A1* | 4/2021 | Altman | H04W 8/205 |
| 2021/0288897 A1* | 9/2021 | Westlin | H04L 41/0631 |

* cited by examiner

MOBILE MESH NETWORK PROVISIONING SYSTEMS AND METHODS

TECHNICAL FIELD

One or more embodiments of the present disclosure relate generally to mesh networks and more particularly, for example, to systems and methods for provisioning mobile mesh networks.

BACKGROUND

Contemporary transportation services often rely on the availability of a network connection and/or line of sight to navigation satellites to assist in navigation and monitoring of vehicles participating in an associated transportation management system. Loss of network connectivity and/or sky line of sight, which can occur in tunnels, forested areas, and among large closely packed buildings, can severely degrade the operability of the transportation management system, particularly in the case of a dynamic transportation matching system that links requesters to fleet vehicles for temporary rental and personal use, where a fleet manager/servicer often wants to monitor the status and use of their fleet vehicles for safety, recovery, and timely deployment purposes, for example, and may want to provide timely navigation and other fleet vehicle use assistance to users of the fleet vehicles. Moreover, integrating cellular data services and/or other third-party communication services into each fleet vehicle, as a mitigating feature, can be relatively expensive both in terms of hardware installation and recurring communication services fees. Stationary mesh networks are similarly relatively expensive to install and maintain across the typical service territory of a dynamic transportation matching system.

Therefore, there is a need in the art for systems and methods to implement and dynamically provision a mobile mesh network for use in the operation and management of fleet vehicles, particularly in the context of a dynamic transportation matching system providing transportation services relying on such fleet vehicles.

SUMMARY

Techniques are disclosed for systems and methods to provision mobile mesh networks. In accordance with one or more embodiments, a mobile mesh network provisioning system may include a wireless communications module configured to be physically coupled to a fleet vehicle and to form at least a part of a mobile mesh network including a plurality of mobile nodes corresponding to a respective plurality of fleet vehicles, and a logic device configured to communicate with the wireless communications module. The logic device may be configured to determine a data route through at least a portion of the mobile mesh network based, at least in part, on a target data destination and a mobile node participation variability associated with the mobile mesh network, and to transmit fleet data associated with the fleet vehicle along the determined data route.

In other embodiments, a method may include determining a data route from a wireless communications module configured to be physically coupled to a fleet vehicle and through at least a portion of a mobile mesh network based, at least in part, on a target data destination and a mobile node participation variability associated with the mobile mesh network, wherein the mobile mesh network includes a plurality of mobile nodes corresponding to a respective plurality of fleet vehicles, and transmitting fleet data associated with the fleet vehicle along the determined data route.

According to some embodiments, a non-transitory machine-readable medium may include a plurality of machine-readable instructions which when executed by one or more processors are adapted to cause the one or more processors to perform a method. The method may include determining a data route from a wireless communications module configured to be physically coupled to a fleet vehicle and through at least a portion of a mobile mesh network based, at least in part, on a target data destination and a mobile node participation variability associated with the mobile mesh network, wherein the mobile mesh network includes a plurality of mobile nodes corresponding to a respective plurality of fleet vehicles, and transmitting fleet data associated with the fleet vehicle along the determined data route.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
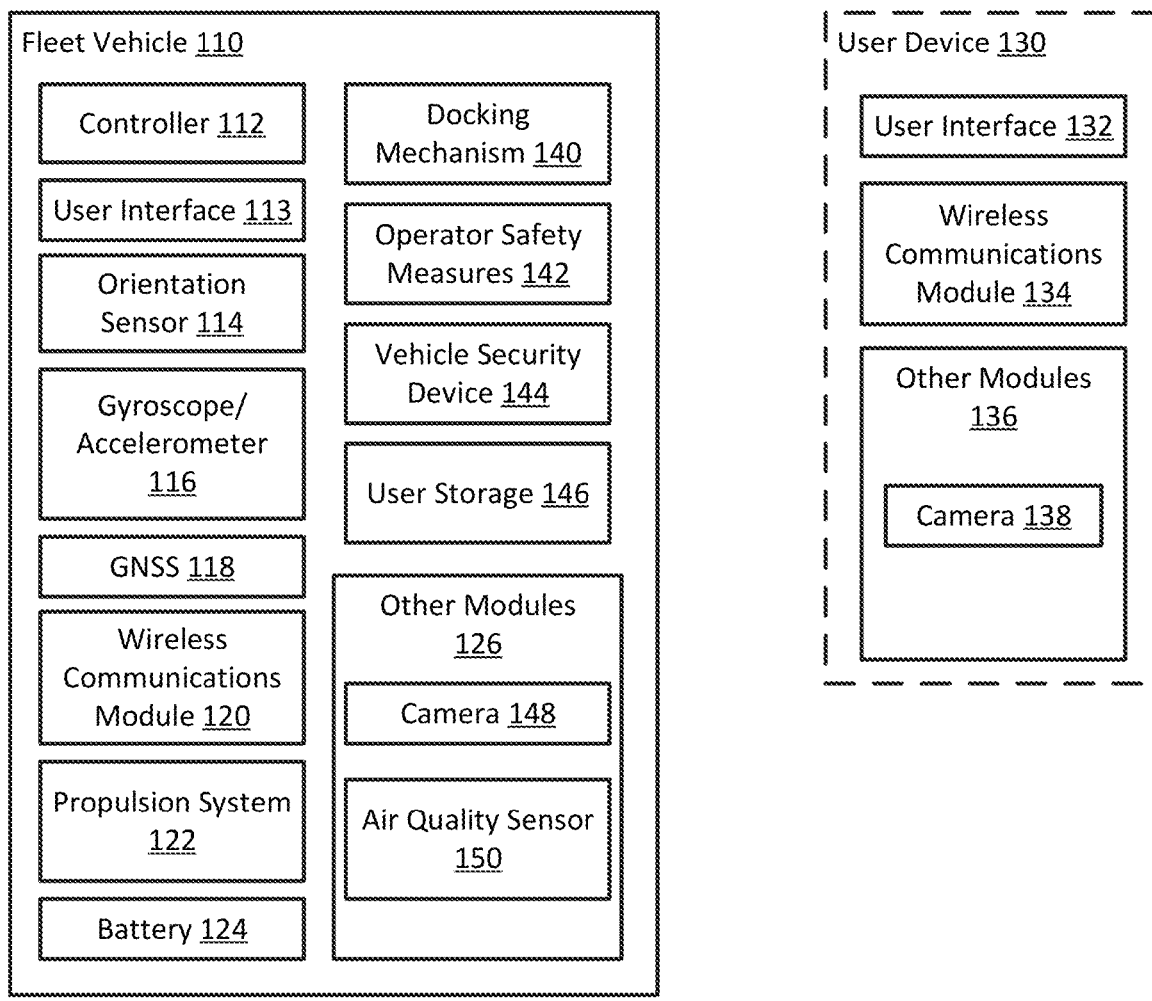
FIG. 1 illustrates a block diagram of a mobile mesh network provisioning system integrated with a fleet vehicle in accordance with an embodiment of the disclosure.

In accordance with various embodiments of the present disclosure, mobile mesh network provisioning systems and methods provide a relatively reliable, inexpensive, and robust communication system to help in the management, operation, and use of fleet vehicles provided for reservation, rental, and/or hire by a fleet manager, such as a transportation services provider employing a dynamic transportation matching system to link fleet vehicles to customers. For example, given a sufficient density of fleet vehicles and associated mobile nodes in a mobile mesh network, a fleet vehicle transiting through a relatively long tunnel or other significant cellular communications obstruction may still be able to send fleet data (e.g., fleet sensor data sourced from the fleet vehicle), receive fleet status data (e.g., navigation assistance notices, other user notices, and/or fleet vehicle directives), and/or relay fleet data and fleet status data sourced/destined for other fleet vehicles.

In particular, mobile mesh network provisioning systems and methods described herein leverage a mobile mesh network for reliable network communications among fleet vehicles and/or to and from a fleet manager/servicer by determining a data route (along a subset of the mobile nodes making up the mobile mesh network) through the mobile mesh network based, at least in part, on mobile node participation variability associated with the mobile mesh network, where the mobile node participation variability, as described herein, is the likelihood of mobile nodes of fleet vehicles (e.g., that are capable of participating in the mobile mesh network) joining or exiting the mobile mesh network, such as with respect to a selected data route. For example, a transmission characteristic estimate (e.g., a probability of a successful complete transmission of a particular collection of data, a mesh network utilization efficiency estimate, a source node or mesh network power utilization estimate, a time of transmission completion) may be determined for a number of viable data routes between a source mobile node associated with the user/rider's fleet vehicle and a target destination, such as a service manager server, where each estimate is based, at least in part, on the associated mobile node participation variability. A data route associated with a transmission characteristic estimate closest to a target or desired transmission characteristic may be selected as the data route to use to transmit and/or receive fleet data and/or fleet status data.

In various embodiments, the process of determining the data route may be performed once for a particular data transmission or may be performed at one or more additional mobile nodes along the data route in order to update the data route if the original data route becomes unexpectedly unavailable. In some embodiments, the process of determining the data route may be performed preemptively, such as when a planned route for the fleet vehicle transits a known communications obstruction. In general, mobile node participation variability may be determined for a particular route based on each mobile node's status (e.g., battery charge), planned route (e.g., expected range to nearest adjacent mobile node), present speed and/or heading, available relay bandwidth, and/or other mobile node participation characteristics, as described herein. As such, mobile mesh network provisioning systems and methods described herein leverage knowledge of the physical movement of the mobile nodes to provide a reliable and efficient data communications network.

Once a data route is selected, the data route and/or accompanying route characteristics may be transmitted to the mobile mesh network and the mobile nodes along the data route to provision the mobile mesh network (e.g., allot sufficient bandwidth and/or interconnections and apply appropriate transmission protocols, such as compression and/or encryption), which may then be used to accept and convey the forthcoming data. As such, the term "provisioning" as used herein includes configuring the mobile mesh network and using the configured mobile mesh network to convey data, as described herein, including dynamically configuring the mobile mesh network during data transfer as the corresponding mobile node participation variability evolves over time. Fleet sensor data sourced from the user/rider's fleet vehicle may include various types of environmental data for user safety and comfort monitoring (e.g., ambient air quality), vehicle status data (e.g., position, battery charge state, abandonment status), image data to monitor an operating area of the fleet vehicle (e.g., to supplement position data otherwise supplied by a global positioning satellite system (GNSS) receiver, or to detect and identify abandoned fleet vehicles in the vicinity), and/or other fleet data as described herein. Fleet status data (e.g., sourced from other fleet vehicles or the fleet manager) may include various types of fleet vehicle directives (e.g., a motor halt directive, an audible and/or visual alarm directive), user notices (e.g., poor air quality associated with a designated route, group status notices/alerts), and/or other fleet status data, as described herein. In some embodiments, wireless communication modules implementing the various mobile nodes in the mobile mesh network may be configured to provide ranges to other mobile nodes within the mobile mesh network, which may be used to determine an estimated position of the user/rider's fleet vehicle, such as when GNSS signals are substantially blocked by obstructions and/or electrical interference.

In general, a mobile mesh network provisioning system may include a mobile node associated with a first or source fleet vehicle (e.g., a wireless communication module integrated with the fleet vehicle and/or a user device associated with a rider of the fleet vehicle) and a logic device (e.g., a controller of the fleet vehicle/user device) configured to communicate with the mobile node. Such mobile node is designated as "mobile" because its location and neighboring mobile nodes within the mobile mesh network typically changes over time, particularly while data is being conveyed through the mobile mesh network. In typical operation, the logic device (e.g., of the first fleet vehicle or user device) may detect a non-mobile mesh network-supported communication link (e.g., a WiFi, cellular, or other star-topology and/or wide area network—WAN—communication link) has become too weak to support reliable communication with a fleet servicer/manager, such as due to interference, as described herein. The logic device may then leverage a second fleet vehicle's relatively strong WAN communication link to convey fleet data to the fleet servicer/manager by provisioning a mobile mesh network including at least the mobile node of the first fleet vehicle, a mobile node of the second fleet vehicle, and interstitial mobile nodes of fleet vehicles participating in the mobile mesh network, to determine a data route through the mobile mesh network based, at least in part, on one or more mobile node participation variabilities, and to transmit fleet data associated with the fleet vehicle along the determined data route through the mobile mesh network.

In various embodiments, the various characteristics of the data route may be determined dynamically at any point of the process, including before a WAN communication link experiences a critical level of interference, after a reliable direct WAN communication link becomes available or the interference clears, and/or during transmission of fleet data. For instance, the logic device may be configured to adjust the determined data route to varying interference, for example, or to extinguish the determined data route upon detecting a reliable direct WAN communication link becoming available, and then to convey fleet data via the direct WAN communication link. In other embodiments, the logic device may be configured to detect participating mobile nodes are within an operable range of the first fleet vehicle, and to join the mobile mesh network prior to requesting the identity of the second mobile node/fleet vehicle with the relatively strong/reliable WAN communication link, as described herein.

FIG. 1 illustrates a block diagram of a mobile mesh network provisioning system 100 integrated with a fleet vehicle 110 in accordance with an embodiment of the disclosure. In the embodiment shown in FIG. 1, mobile mesh network provisioning system 100 includes fleet vehicle 110 and optional user device 130. In general, fleet vehicle 110 may be a passenger vehicle designed to transport a single transportation requester (e.g., a micro-mobility fleet vehicle) or a group of transportation requesters (e.g., a typical car or truck). More specifically, fleet vehicle 110 may be implemented as a motorized or electric kick scooter, bicycle, and/or motor scooter designed to transport one or perhaps two riders at once typically on a paved road (collectively, micro-mobility fleet vehicles), as a typical automobile configured to transport up to 4, 7, or 10 transportation requesters at once in a shared ride, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user or rider of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user or rider via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user/rider. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user/rider and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 and/or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein.

In particular, in some embodiments, operator safety measures 142 may be implemented as one or more of a headlight, a taillight, ambient lighting, a programmable lighting element (e.g., a multi-color panel, strip, or array of individual light elements, such as addressable light emitting diodes (LEDs), recessed and/or directional lighting, actuated lighting (e.g., articulated lighting coupled to an actuator), and/or other lighting coupled to and/or associated with fleet vehicle 110 and controlled by controller 112. In other embodiments, operator safety measures 142 may include a speaker or other audio element configured to generate an audible alarm or sound to warn a rider or passersby of a detected safety concern, for example, or to inform a rider of a potential safety concern. More generally, operator safety measures 142 may be any electronic, mechanical, or electromechanical device or subsystem configured to increase the safety of a rider and/or mitigate potential harm to a rider under nominal operating conditions.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user/rider. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user/rider and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
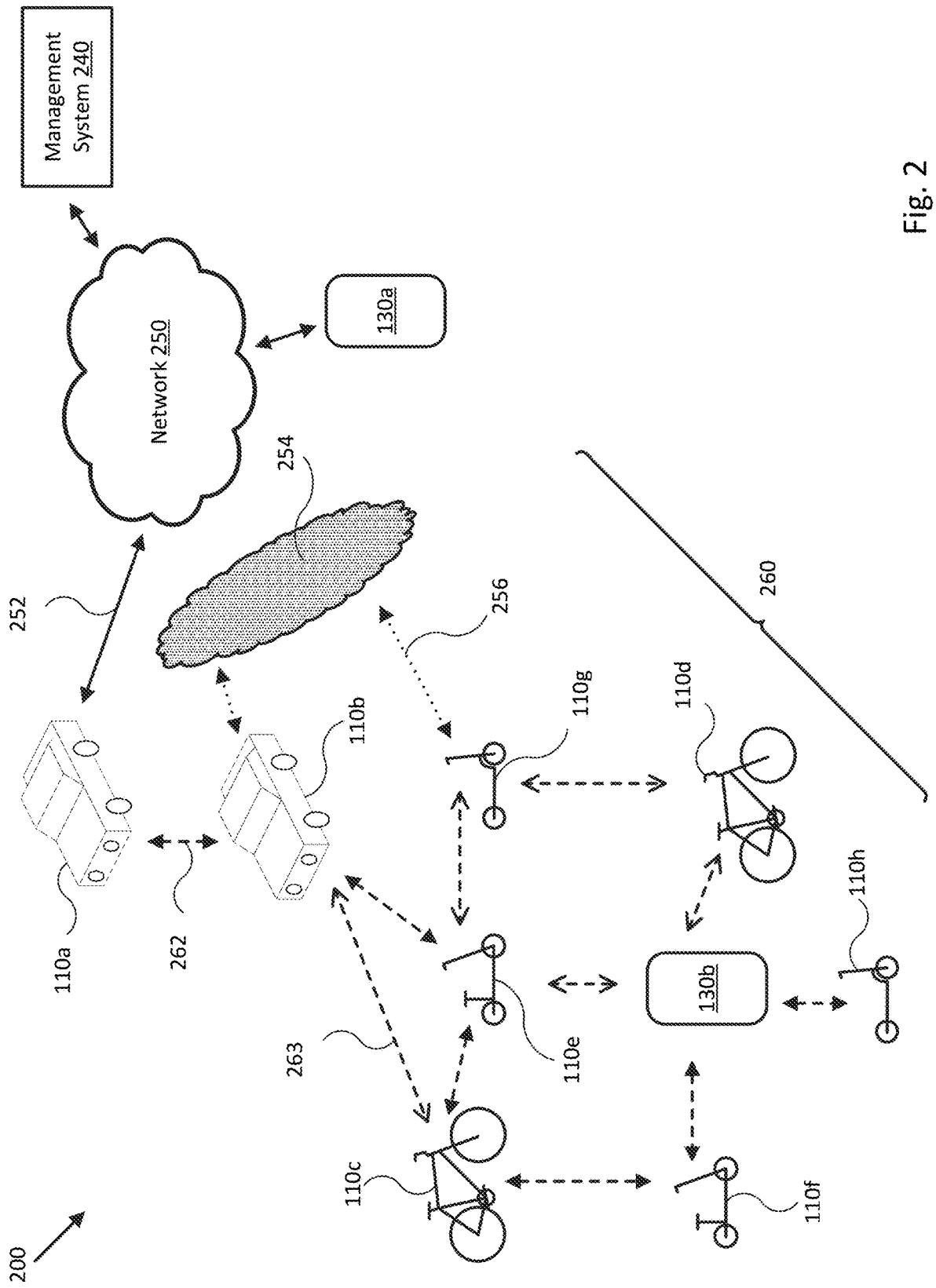
FIG. 2 illustrates a block diagram of a dynamic transportation matching system including a mobile mesh network provisioned using a mobile mesh network provisioning system in accordance with an embodiment of the disclosure.

FIG. 2 illustrates a block diagram of dynamic transportation matching system 200 including a mobile mesh network 260 provisioned using mobile mesh network provisioning system 100 in accordance with an embodiment of the disclosure. In the embodiment shown in FIG. 2, dynamic transportation matching system 200 includes management system/server 240 in communication with a number of fleet vehicles 110a-h and user devices 130a-b over a combination of a typical wide area network (WAN) 250, WAN communication links 252 (solid lines), and mobile mesh network 260 including a variety of mesh network communication links 262 (dashed lines with closed arrows) and 263 (dashed lines with open arrows). Also shown in FIG. 2 is communication services obstruction 254 blocking WAN communication links 256 (dotted lines) attempted by fleet vehicles 110b and 110g.

As shown in FIG. 2, all fleet vehicles aside from fleet vehicle 110a are unable to communication directly to WAN 250 and instead rely on various route legs within mobile mesh network 260 to convey fleet data and/or fleet status data amongst themselves and/or to and from management system 240. Each fleet vehicle 110a-h includes an embodiment of mobile mesh network provisioning system 100 configured to determine a data route between the wireless communications module of the associated fleet vehicle and a target destination within mobile mesh network 260 and/or coupled through WAN 250, including management system 240 and/or user device 130a. In particular, mesh network communication links 262 (dashed lines with closed arrows) indicate a six route leg data route from fleet vehicle 110h to fleet vehicle 110 within mobile mesh network 260, where the data route of mesh network communication links 262 is based on a mobile node participation variability of mobile mesh network 260 (e.g., where fleet vehicle 110g is likely to leave mobile mesh network 260 and mesh network communication link 263 between fleet vehicle 110e and use device 130b is likely to become congested).

In FIG. 2, a customer may use user device 130a to reserve or rent one of fleet vehicles 110a-h by transmitting a transportation request to management system 240 over WAN 250, allowing management system 240 to poll status of fleet vehicles 110a-h over a combination of WAN 250 and mobile mesh network 260 and to select one of fleet vehicles 110a-h to fulfill the transportation request, receiving a fulfillment notice from management system 240 and/or from the selected fleet vehicle, and receiving navigation instructions to proceed to or otherwise meet with the selected fleet vehicle. A similar process may be used by a customer using user device 130b, but where the initial transportation request is transmitted initially over mobile mesh network 260, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110a-h, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 262 may be wireless communication links between mobile nodes of mobile mesh network 260, where each mobile node of mobile mesh network 260 is associated with one of fleet vehicles 110a-h, as described herein.

Figure 3A:
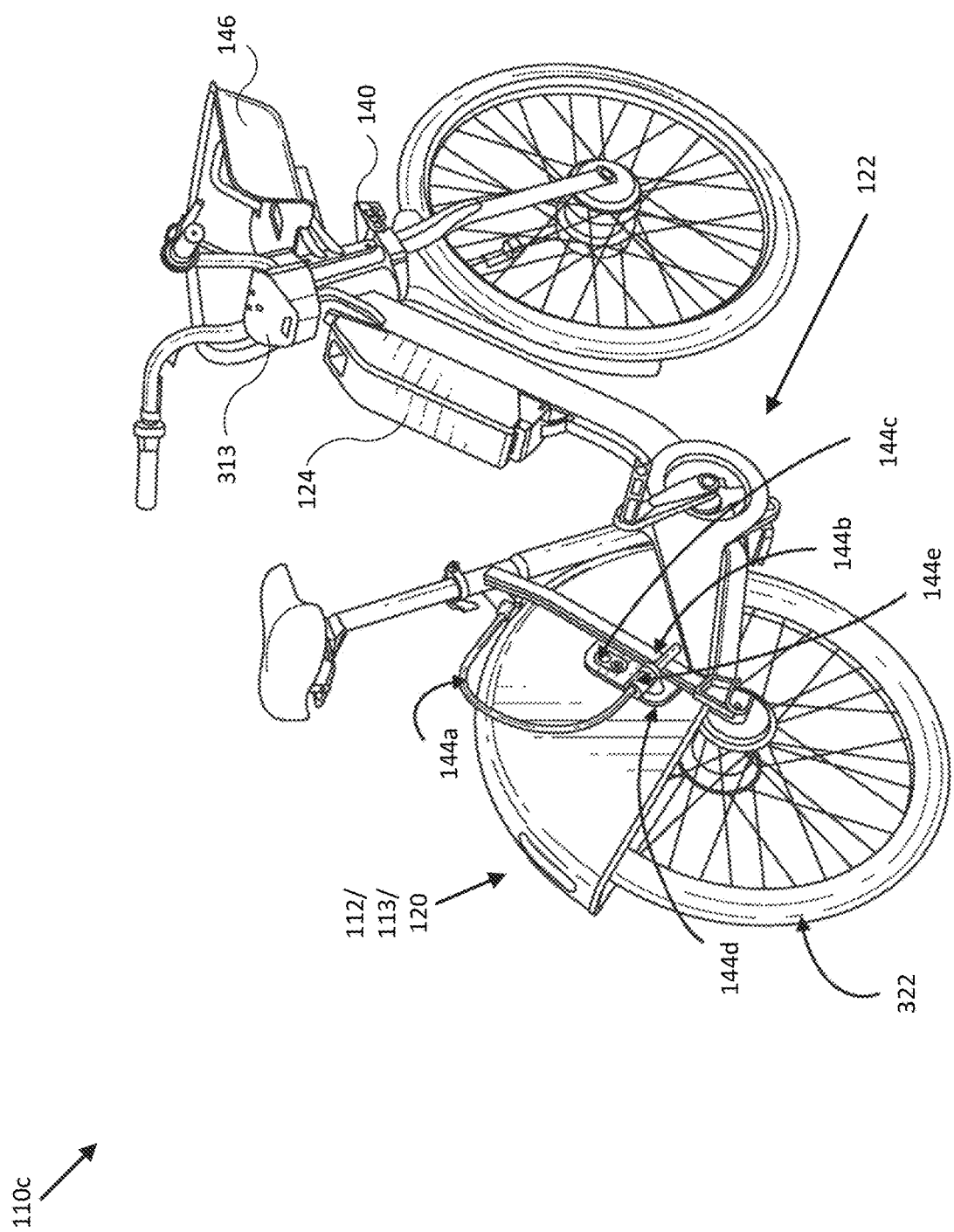
FIGS. 3A-D illustrate diagrams of micro-mobility fleet vehicles integrated with mobile mesh network provisioning systems in accordance with an embodiment of the disclosure.
Figure 3B:
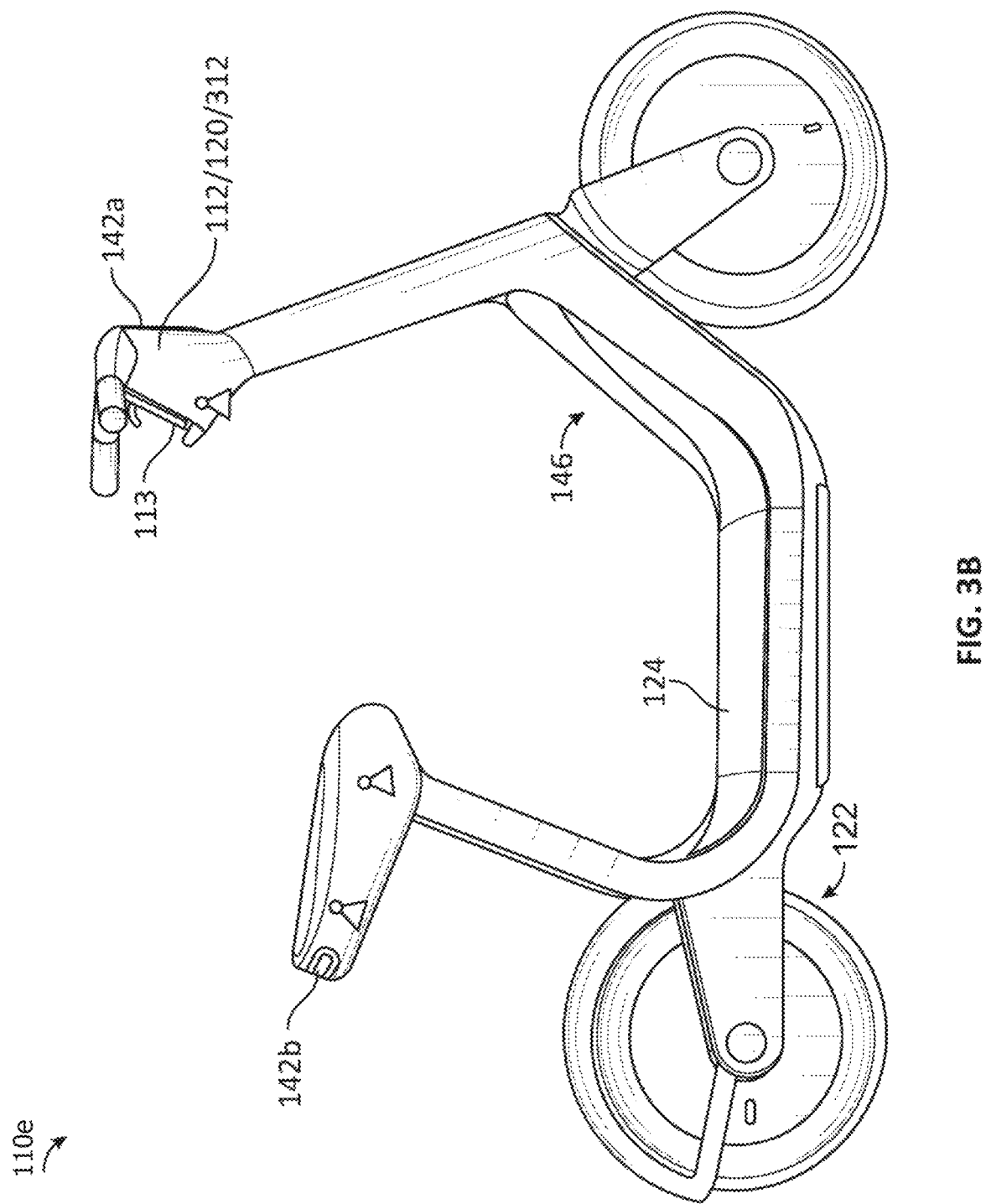
Figure 3C:
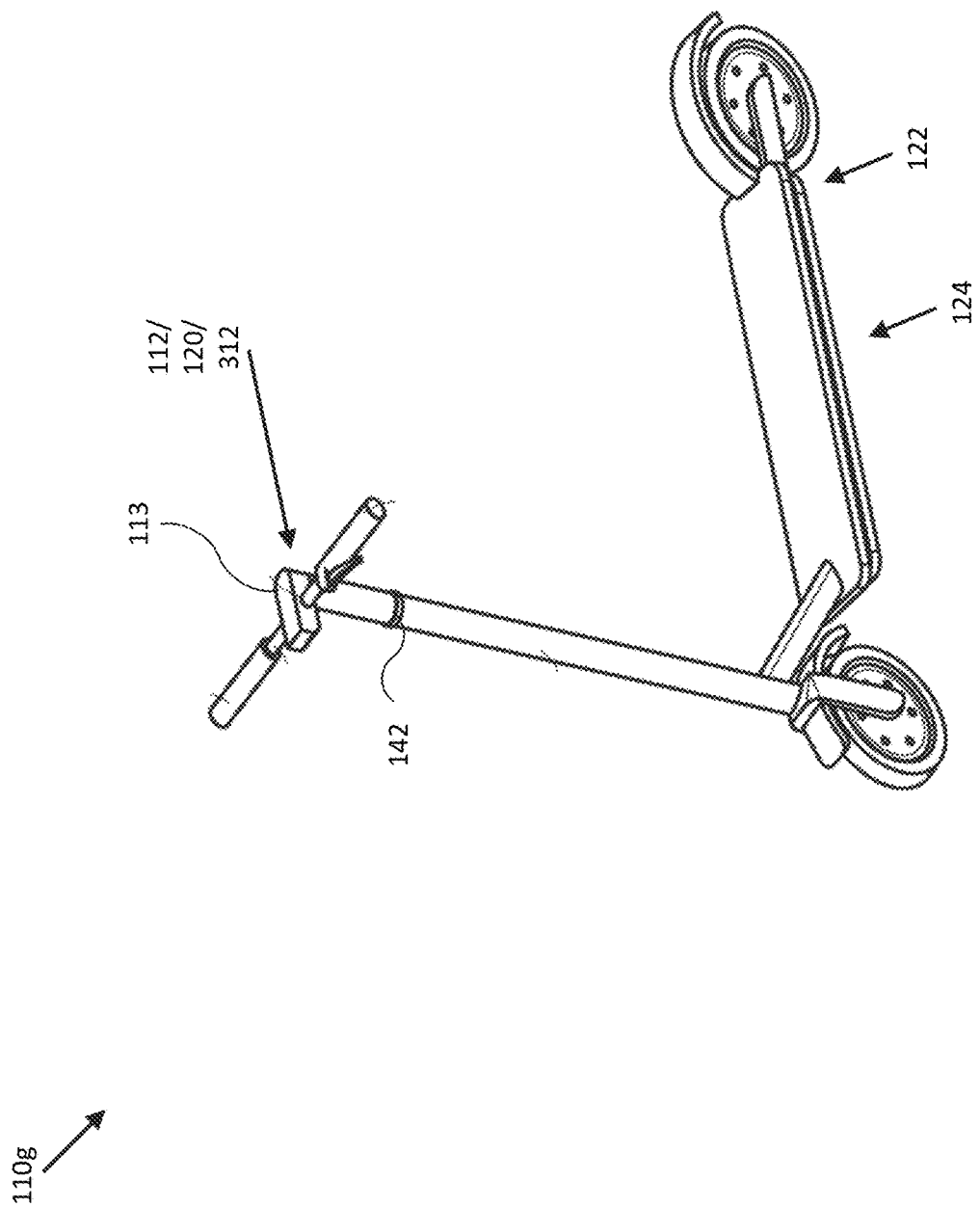

FIGS. 3A-C illustrate diagrams of micro-mobility fleet vehicles 110c, 110e, and 110g, which may be integrated with mobile mesh network provisioning systems in accordance with embodiments of the disclosure. For example, fleet vehicle 110c of FIG. 3A may correspond to a motorized (e.g., electric and/or battery powered) bicycle that is integrated with the various elements of mobile mesh network provisioning system 100 and may be configured to detect, join, and provision mobile mesh network 260 of FIG. 2, for example, and may be configured to participate in dynamic transportation matching system 200 of FIG. 2, as described herein. As shown, fleet vehicle 110c includes controller/user interface/wireless communications module 112/113/120 (e.g., integrated with a rear fender of fleet vehicle 110c), propulsion system 122 configured to provide motive power to at least one of the wheels (e.g., a rear wheel 322) of fleet vehicle 110c, battery 124 for powering propulsion system 122 and/or other elements of fleet vehicle 110c, docking mechanism 140 (e.g., a spade lock assembly) for docking fleet vehicle 110c at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure/cockpit assembly 313, as shown.

In some embodiments, vehicle security device 144 may be implemented as a wheel lock configured to immobilizing rear wheel 322 of fleet vehicle 110c, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize fleet vehicle 110c by default, thereby requiring a requestor to transmit a reservation request to management system 240 (e.g., via user device 130) to reserve, rent, and/or hire fleet vehicle 110c before attempting to use fleet vehicle 110c. The reservation request may identify fleet vehicle 110c based on an identifier (e.g., a QR code, a barcode, a serial number, etc.) presented on fleet vehicle 110c (e.g., such as by user interface 113 on a rear fender of fleet vehicle 110c). Once the reservation request is approved (e.g., payment is processed), management system 240 may transmit an unlock signal to fleet vehicle 110c (e.g., via network 250). Upon receiving the unlock signal, fleet vehicle 110c (e.g., controller 112 of fleet vehicle 110c) may release vehicle security device 144 and unlock rear wheel 322 of fleet vehicle 110c.

Fleet vehicle 110e of FIG. 3B may correspond to a motorized (e.g., electric and/or battery powered) sit-scooter that is integrated with the various elements of system 100 and may be configured to detect, join, and provision mobile mesh network 260 of FIG. 2, for example, and to participate in dynamic transportation matching system 200 of FIG. 2. As shown in FIG. 3B, fleet vehicle 110e includes many of the same elements as those discussed with respect to fleet vehicle 110c of FIG. 3A. For example, fleet vehicle 110e may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlight assemblies, taillight assemblies, programmable light elements/strips/spotlights, and/or reflective strips, as described herein. As shown in FIG. 3B, fleet vehicle 110e may also be implemented with various other vehicle light assemblies to increase visibility, to provide ambient lighting, and/or to provide lighted beaconing, as described herein.

Fleet vehicle 110g of FIG. 3C may correspond to a motorized (e.g., electric and/or battery powered) stand or kick scooter that is integrated with the various elements of system 100 and may be configured to detect, join, and provision mobile mesh network 260 of FIG. 2, for example, and to participate in dynamic transportation matching system 200 of FIG. 2. As shown in FIG. 3C, fleet vehicle 110g includes many of the same elements as those discussed with respect to fleet vehicle 110c of FIG. 3A. For example, fleet vehicle 110g may include user interface 113, propulsion system 122, battery 124, controller/wireless communications module/cockpit enclosure 112/120/312, and operator safety measures 142, which may be implemented as various types of programmable light strips and/or reflective strips, as shown. In general, micro-mobility fleet vehicles 110c, 110e, and 110g may be powered by a battery coupled to an electric motor mechanically linked to one or both tires, for example, and may be configured to report a battery charge status as fleet data transmitted over mobile mesh network 260.

Figure 3D:
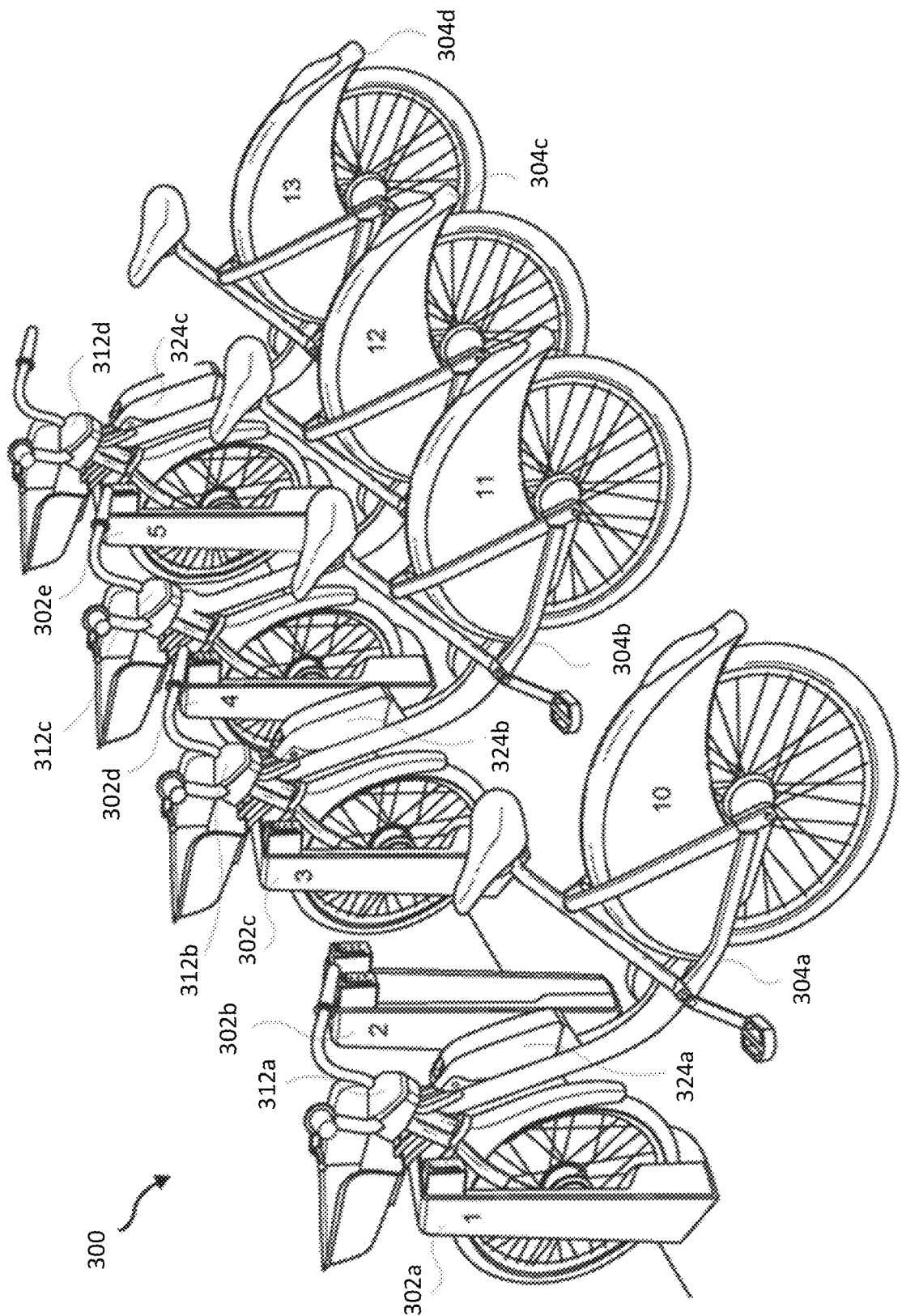

FIG. 3D illustrates a docking station 300 for docking fleet vehicles (e.g., fleet vehicles 110c, 110e, and 110g, etc.) in accordance with embodiments of the disclosure. As shown in FIG. 3D, docking station 300 may include multiple bicycle docks, such as docks 302a-e. For example, a single fleet vehicle (e.g., any one of electric bicycles 304a-d) may dock in each of docks 302a-e of docking station 300. Each of docks 302a-e may include a lock mechanism for receiving and locking docking mechanism 140 of electric bicycles 304a-d. In some embodiments, once a fleet vehicle is docked in a bicycle dock, the dock may be electronically and/or communicatively coupled to the fleet vehicle (e.g., to controllers and/or wireless communications modules integrated within cockpit enclosures 312a-d of fleet vehicles 304a-d) via a communication link such that the fleet vehicle may be charged by the dock and the fleet vehicle and the dock may communicate with each other via the communication link (e.g., similar to communications over mobile mesh network 260), as described herein.

For example, a requestor may use user device 130a to reserve, rent, and/or hire a fleet vehicle docked to one of bicycle docks 302a-e by transmitting a reservation request to management system 240. Once the reservation request is processed, management system 240 may transmit an unlock signal to a docked fleet vehicle and/or one of docks 302a-e via network 250 and/or mobile mesh network 260. One of docks 302a-e may automatically unlock an associated lock mechanism to release the fleet vehicle based, at least in part, on such unlock signal. In some embodiments, each of docks 302a-e may be configured to charge batteries (e.g., batteries 324a-c) of electric bicycles 304a-d while electric bicycles 304a-d are docked at docks 302a-e. In some embodiments, docking station 300 may also be configured to transmit status information associated with docking station 300 (e.g., a number of fleet vehicles docked at docking station 300, charge statuses of docked fleet vehicles, and/or other fleet status information) to management system 240.

Figure 4:
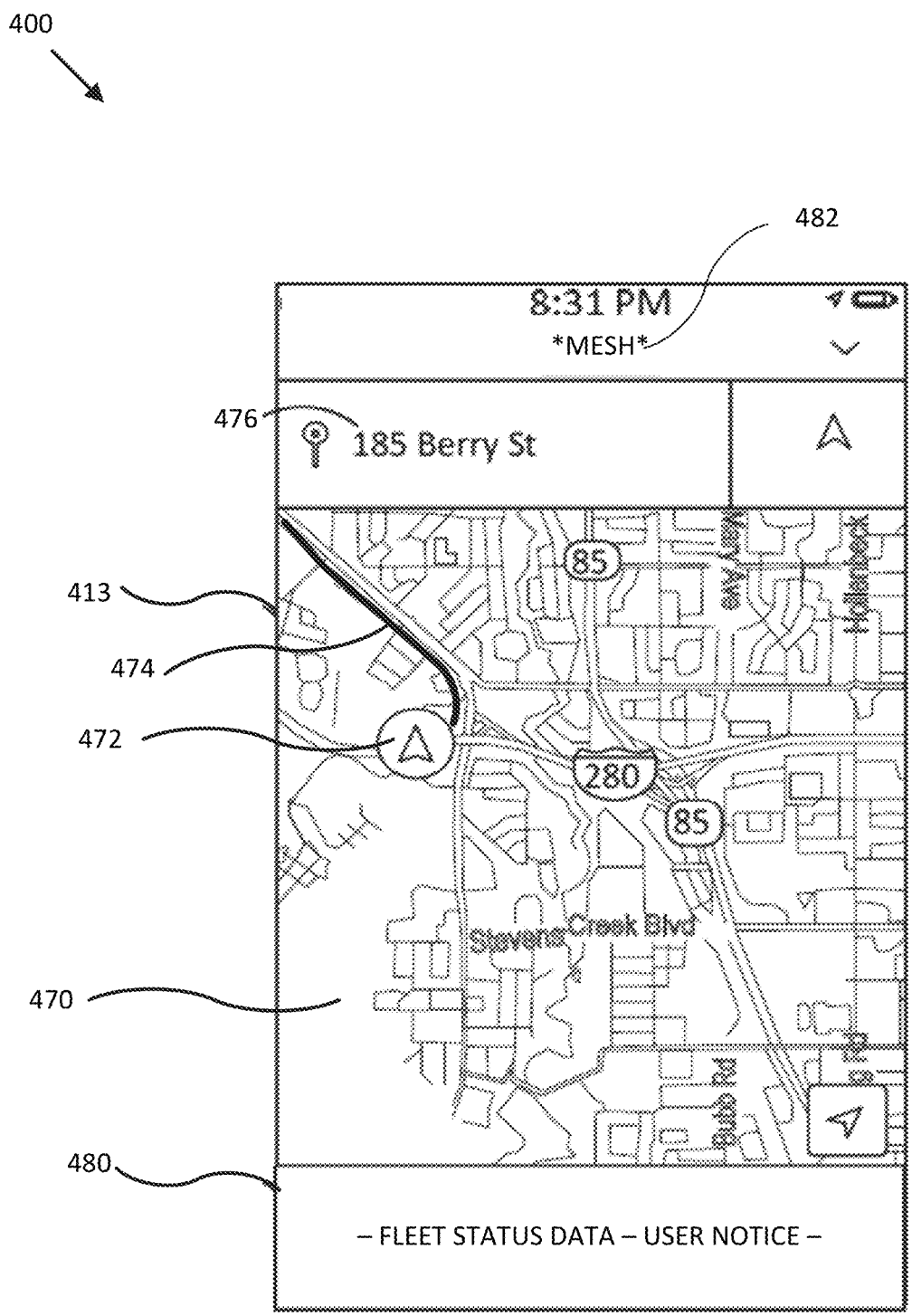
FIG. 4 illustrates a display view rendered by a display of a user interface for a mobile mesh network provisioning system in accordance with an embodiment of the disclosure.

FIG. 4 illustrates a display view 400 rendered by a display of user interface 113 or 132 for mobile mesh network provisioning system 100 in accordance with an embodiment of the disclosure. In the embodiment shown in FIG. 4, display view 400 corresponds to a navigation assistance rendering within a display border 413 of a display of user interface 113 and/or 132 of mobile mesh network provisioning system 100, where display view 400 includes an underlying street map 470, a present location indicator 472 rendered over street map 470 to indicate a present absolute position of fleet vehicle 110 on street map 470, a navigation route indicator 474 rendered over street map 470 to indicate a planned navigation route for fleet vehicle 110, and a navigation destination selector/indicator 476 rendered above street map 470 and configured to allow a requestor or rider to input a desired navigation destination for fleet vehicle 110. Also shown in display view 400 is a notice window 480 rendered below street map 470 and a mobile mesh network activity indicator 482. Notice window 480 may be used to render fleet status data, including user notices and/or alerts, as described herein, for communication to a rider of fleet vehicle 110. Mobile mesh network activity indicator 482 may be configured to indicate to a rider when communications are employing mobile mesh network 260.

Figure 5:
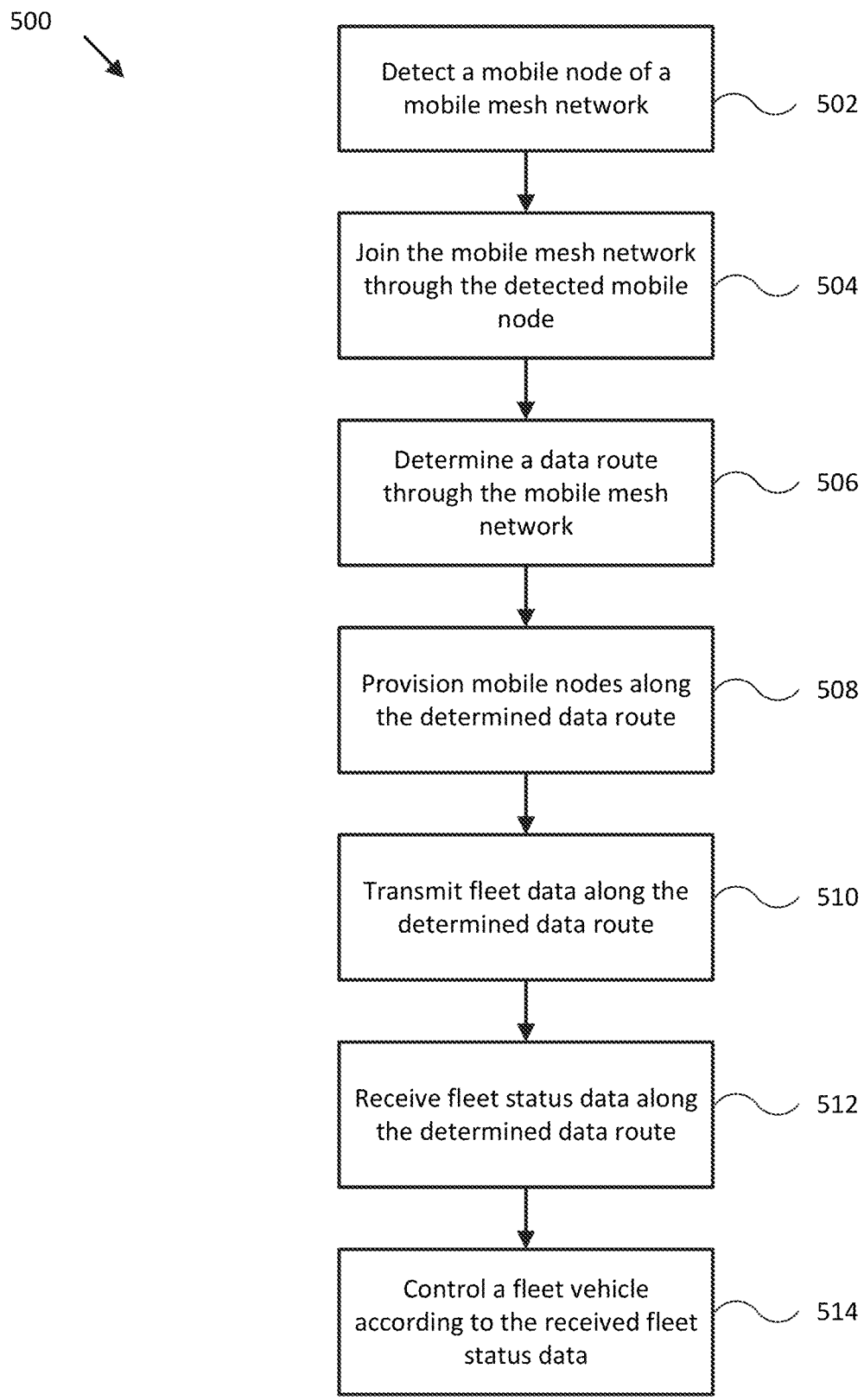
FIG. 5 illustrates a flow diagram of a process to perform mobile mesh network provisioning in accordance with an embodiment of the disclosure.

FIG. 5 illustrates a flow diagram of a process 500 to perform mobile mesh network provisioning in accordance with an embodiment of the disclosure. It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems, processes, control loops, and images described in reference to FIGS. 1-4, process 500 may be performed by other systems different from those systems, processes, control loops, and images and including a different selection of electronic devices, sensors, assemblies, mobile structures, and/or mobile structure attributes, for example.

In block 502, a mobile node of a mobile mesh network is detected. For example, controller 112 and/or user device 130 may be configured to detect one or more of a plurality of mobile nodes (e.g., wireless communications modules associated with fleet vehicles 110a-h) of mobile mesh network 260 within an operable range of wireless communications module 120 and/or 134 associated with fleet vehicle 110. In some embodiments, controller 112 and/or user device 130 may be configured to determine a range to one or more of the plurality of mobile nodes, for example, and use such ranges to determine a position estimate of fleet vehicle 110, such as by triangulation among multiple mobile nodes with reported absolute positions or position estimates (e.g., fleet status data).

In block 504, a mobile mesh network is joined. For example, controller 112 and/or user device 130 may be configured to join mobile mesh network 260 through at least one of the mobile nodes associated with fleet vehicles 110a-h of mobile mesh network 260 detected in block 502. In some embodiments, joining mesh network 260 may include provisioning a single route leg from wireless communications module 120 or 134 to an adjacent mobile node, such as negotiating authorized access to mobile mesh network 260 based, at least in part, on a pre-shared key (e.g., distributed over WAN 250), a signed certificate, and/or other authorization token or protocol.

In block 506, a data route through a mobile mesh network is determined. For example, controller 112, user device 130, and/or management system 240 may be configured to determine a data route through at least a portion of mobile mesh network 260 (e.g., a combination of one or more mesh communication links 262), based, at least in part, on a target data destination and a mobile node participation variability associated with mobile mesh network 260. In some embodiments, the determining the data route through the portion of mobile mesh network 260 includes determining a transmission characteristic estimate for each of a plurality of possible data routes from wireless communications module 120 or 134 through the portion of mobile mesh network 260 based, at least in part, on the mobile node participation variability, and then selecting the data route as one of the plurality of possible data routes with a corresponding transmission characteristic estimate closest to a target transmission characteristic.

In some embodiments, the transmission characteristic estimate may include one or more of a probability of complete transmission of the fleet data to a target data destination (e.g., another one of fleet vehicles 110a-h, management system 240, or another data destination reachable through WAN 250), a mesh network utilization efficiency, a source node or mesh network power utilization, and/or a completion time of transmission, for example, and the target transmission characteristic may include one or more of a highest probability of complete transmission of the fleet data to the target data destination, a highest mesh network utilization efficiency, a lowest source node or mesh network power utilization, and/or a shortest or targeted completion time of transmission. In various embodiments, the mobile node participation variability includes a likelihood for mobile nodes associated with fleet vehicles 110a-h to join or exit mobile mesh network 260 along each of the plurality of possible data routes within mobile mesh network 260, which can impact the transmission characteristic estimate, as described herein.

Each possible data route through mobile mesh network 260 includes a series of network addresses corresponding to a series of mobile nodes of mobile mesh network 260 indicating route legs 262 of the data route through the portion of mobile mesh network 260, as shown in FIG. 2. In related embodiments, at least one of the plurality of possible data routes through mobile mesh network 260 may include a mobile node relay delay indicating a particular mobile node and a corresponding hold time to buffer the fleet data before forwarding along the at least one possible data route. Such mobile node relay delay may be forced, for example, where the designated mobile node is required, if possible, to hold and then release transmitted data according to the hold time. In other embodiments, such mobile node relay delay may be a maximum or minimum applied to multiple mobile nodes, for example, or to all mobile nodes in the determined data route through mobile mesh network 260.

In various embodiments, controller 112, user device 130, and/or management system 240 may be configured to train and/or execute a machine learning model configured to determine the mobile node participation variability based on a variety of fleet state data and/or fleet sensor data, for example, relatively quickly and reliably, using historical fleet state and sensor data (e.g., stored within management system 240) associated with a geographical area of mobile mesh network 260, a time of day, a day of the week, and/or other spatiotemporal or other characteristics associated with mobile mesh network 260 and/or fleet vehicle 110 and stored within historical fleet state data and/or fleet sensor data managed by management system 240.

In block 508, mobile nodes along a determined data route are provisioned. For example, controller 112, user device 130, and/or management system 240 may be configured to transmit the data route determined in block 506 to mobile mesh network 260 (e.g., to any mobile node along the data route determined in block 506) to provision a corresponding subset of mobile nodes 110a-h along the determined data route (e.g., allot sufficient bandwidth and/or interconnections and apply appropriate transmission protocols, such as compression and/or encryption). In some embodiments, the data route determined in block 506 may be transmitted to any mobile node within mobile mesh network 260, and mobile mesh network 260 may be configured to redistribute the data route to the appropriate mobile nodes (e.g., according to a housekeeping protocol collectively organizing operation of mobile mesh network 260).

In block 510, fleet data is transmitted. For example, controller 112 and/or user device 130 may be configured to transmit fleet data associated with fleet vehicle 110 along the data route determined in block 506 and provisioned in block 508. In some embodiments, the fleet data includes fleet sensor data provided by user device 130 or a fleet vehicle sensor (e.g., camera 148, air quality sensor 150) configured to be physically coupled to the fleet vehicle and/or to provide the fleet sensor data to controller 112 and/or wireless communications module 113. For example, user device 130 and/or the fleet vehicle sensor may include GNSS receiver 118 configured to provide absolute positions of fleet vehicle 110 and/or user device 130, air quality sensor 150 configured to provide ambient air quality measurements associated with an environment local to fleet vehicle 110, and/or camera 148 configured to provide images of an environment in front of and/or about fleet vehicle 110. In various embodiments, all fleet vehicles 110 may be implemented with air quality sensor 150 and be configured to monitor and report air quality measurements at least throughout mobile mesh network 260.

In a specific embodiment, controller 112 and/or user device 130 may be configured to determine fleet vehicle 110 is abandoned based, at least in part, on a time series of absolute positions of fleet vehicle 110 provided by GNSS receiver 118 and/or a time series of images provided by camera 148. Alternatively, controller 112 and/or user device 130 may be configured to make such determination based on a time series of position estimates based on ranges to adjacent mobile nodes in mobile mesh network 260, as described herein. Upon determining fleet vehicle is likely abandoned, controller 112 and/or user device 130 may be configured to transmit an abandoned fleet vehicle alert and at least one of the time series of positions and/or images along the data route determined in block 508 through at least the portion of mobile mesh network 260.

In block 512, fleet status data is received. For example, controller 112 and/or user device 130 may be configured to receive fleet status data transmitted over the mobile mesh network provisioned in block 508. In some embodiments, the received fleet status data may include a fleet vehicle directive and/or a user notice (e.g., a rider notice) designated for fleet vehicle 110. For example, the fleet vehicle directive may include a motor halt directive and/or an audible alarm directive (e.g., when an attempted vehicle theft is detected, such as movement without a rental payment, or lifting off the ground), and the user/rider notice may include a poor air quality notice (aggregated from other fleet vehicle sensor data), a user/rider group disassociation notice (e.g., when a group member of a designated group ride has unexpectedly deviated from the group travel), a traffic congestion notice (e.g., along a planned navigation route), a bike lane or line direction notice (e.g., to ease transit through a bike lane or line to a desired destination), a designated or revised drop off position notice (e.g., to avoid causing or participating in or suffering from traffic congestion), and/or another user notice, as described herein.

In additional embodiments, controller 112 and/or user device 130 may be configured to relay remotely generated fleet data and/or fleet status data, such as to participate as a transceiving member of mobile mesh network 260. For example, controller 112 and/or user device 130 may be configured to receive a remotely determined data route associated with at least one of the plurality of mobile nodes of mesh network 260, provision wireless communications module 120 according to the received remotely determined data route, relay remotely generated fleet data and/or fleet status data according to the received remotely determined data route, and optionally reprovision wireless communications module 120 according to the data route determined in block 508 (e.g., to continue as a source/destination node for fleet data and fleet status data).

In block 514, a fleet vehicle is controlled. For example, controller 112 and/or user device 130 may be configured to control fleet vehicle 110 according to fleet status data received in block 512. In some embodiments, controller 112 and/or user device 130 may be configured to control fleet vehicle 110 according to the received fleet vehicle directive and/to or communicate the rider notice to a rider of fleet vehicle 110 via user interface 113 and/or 134. For example, the fleet vehicle directive may include a motor halt directive and/or an audible alarm directive, and controller 112 and/or user device 130 may be configured to control propulsion system 122 to impede motion of wheels of fleet vehicle 110, for example, and/or to flash a light or sound an audible alarm integrated with fleet vehicle 110. In other embodiments, the fleet vehicle directive may include an autopilot enable directive and a navigation destination causing fleet vehicle to proceed to the designated navigation destination. In a further embodiment, the fleet vehicle directive may include a communications service directive causing wireless communications module 120 to attempt to establish a WAN communication link to a WAN network. More generally, the fleet vehicle directive may include any directive causing fleet vehicle 110 to enable or disable or otherwise operate an element of system 100 in FIG. 1.

Embodiments of the present disclosure can thus provide relatively low cost, reliable, and robust network connectivity and fleet data sharing for a group of fleet vehicles when alternative communication services are unavailable or expensive. Moreover, embodiments may also provide a mobile mesh network provisioning system capable of assisting in transportation system management and user navigation of fleet vehicles through use of position estimates based on range determinations derived from mere operation of the mobile mesh network, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A mobile mesh network provisioning system, comprising:
   a wireless communications module configured to be physically coupled to a fleet vehicle and to form at least a part of a mobile mesh network comprising a plurality of mobile nodes associated with a respective plurality of fleet vehicles, wherein the mobile mesh network comprises a secondary network connection for the fleet vehicle; and a logic device associated with the fleet vehicle and configured to communicate with the wireless communications module, wherein the logic device is further configured to:

in response to determining a likely unavailability of a primary network connection for the fleet vehicle based on a planned travel path of the fleet vehicle:

identify, by a machine-learning model trained to identify mobile node participation variabilities for each of a plurality of data routes within the mobile mesh network based on vehicle fleet state data and vehicle fleet sensor data associated with at least one geographical area of the mobile mesh network, a mobile node participation variability for one or more data routes, wherein the mobile node participation variability comprises a likelihood that one or more of the plurality of mobile nodes will join or exit the mobile mesh network;

determine a data route through the mobile mesh network based on a target data destination and the identified mobile node participation variability; and transmit fleet data associated with the fleet vehicle along the determined data route via the wireless communications module.

2. The mobile mesh network provisioning system of claim 1, wherein the logic device is further configured to:

detect one or more of the plurality of mobile nodes of the mobile mesh network within an operable range of the wireless communications module; and join the mobile mesh network through at least one of the one or more detected mobile nodes of the mobile mesh network prior to the determining the determined data route.

3. The mobile mesh network provisioning system of claim 1, wherein the determining the data route through the mobile mesh network comprises:

determining a transmission characteristic estimate for each of the plurality of data routes from the wireless communications module through the mobile mesh network based on the mobile node participation variability; and selecting a data route from the plurality of data routes, the selected data route having a corresponding transmission characteristic estimate closest to a target transmission characteristic.

4. The mobile mesh network provisioning system of claim 3, wherein:

the transmission characteristic estimate comprises a probability of complete transmission of the fleet data to the target data destination, a mesh network utilization efficiency, a source node or mesh network power utilization, or a completion time of transmission; and the target transmission characteristic comprises the highest probability of complete transmission of the fleet data to the target data destination, a highest mesh network utilization efficiency, a lowest source node or mesh network power utilization, or a shortest or targeted completion time of transmission.

5. The mobile mesh network provisioning system of claim 3, wherein:

at least one of the plurality of possible data routes through the mobile mesh network comprises a mobile node relay delay indicating a particular mobile node and a corresponding hold time to buffer the fleet data before forwarding along the at least one possible data route.

6. The mobile mesh network provisioning system of claim 1, wherein:

the determined data route comprises a series of network addresses corresponding to a series of mobile nodes of the mobile mesh network indicating route legs of the determined data route through the mobile mesh network; and the logic device is further configured to transmit the determined data route to the mobile mesh network to provision mobile nodes along the determined data route prior to transmitting the fleet data.

7. The mobile mesh network provisioning system of claim 1, wherein the logic device is further configured to:

receive a remotely determined data route associated with at least one of the plurality of mobile nodes of the mesh network;

provision the wireless communications module according to the received remotely determined data route;

relay remotely generated fleet data or fleet status data according to the received remotely determined data route; and reprovision the wireless communications module according to the determined data route.

8. The mobile mesh network provisioning system of claim 1, wherein the fleet vehicle comprises a micro-mobility fleet vehicle, the system further comprising a user interface configured to receive user input from or provide user feedback to a rider of the fleet vehicle, wherein the logic device is further configured to:

receive fleet status data transmitted over the mobile mesh network, wherein the fleet status data comprises a fleet vehicle directive or a rider notice designated for the fleet vehicle; and control the fleet vehicle according to the received fleet vehicle directive or communicate the rider notice to the rider of the fleet vehicle via the user interface;

wherein the fleet vehicle directive comprises a motor halt directive or an audible alarm directive, and wherein the rider notice comprises a poor air quality notice, a rider group disassociation notice, a traffic congestion notice, a bike lane direction notice, or a designated or revised drop off position notice.

9. The mobile mesh network provisioning system of claim 1, wherein:

the fleet data comprises fleet sensor data provided by a user device or a fleet vehicle sensor configured to be physically coupled to the fleet vehicle or to provide the fleet sensor data to the logic device; and the user device or the fleet vehicle sensor comprises a GNSS receiver configured to provide absolute positions of the fleet vehicle or the user device, an air quality sensor configured to provide an ambient air quality local to the fleet vehicle, or a camera configured to provide images of an environment in front of or about the fleet vehicle.

10. The mobile mesh network provisioning system of claim 9, wherein the logic device is further configured to:

determine the fleet vehicle is abandoned based on a time series of the absolute positions of the fleet vehicle provided by the GNSS receiver or a time series of the images provided by the camera; and transmit an abandoned fleet vehicle alert and at least one of the time series of absolute positions or images along the determined data route through at least the portion of the mobile mesh network.

11. A method for provisioning a mobile mesh network comprising a plurality of mobile nodes associated with a plurality of fleet vehicles, comprising:
 in response to determining a likely unavailability of a primary network connection for a fleet vehicle based on a planned travel path of the fleet vehicle:
  identifying, by a machine-learning model trained to identify mobile node participation variabilities for each of a plurality of data routes within the mobile mesh network based on vehicle fleet state data and vehicle fleet sensor data associated with at least one geographical area of the mobile mesh network, a mobile node participation variability for one or more data routes, wherein the mobile node participation variability comprises a likelihood that one or more of the plurality of mobile nodes will join or exit the mobile mesh network;
  determining a data route from a wireless communications module configured to be physically coupled to the fleet vehicle and through the mobile mesh network based on a target data destination and the identified mobile node participation variability wherein the mobile mesh network comprises a secondary network connection for the fleet vehicle; and
  transmitting fleet data associated with the fleet vehicle along the determined data route via the wireless communications module.

12. The method of claim 11, further comprising:
 detecting one or more of the plurality of mobile nodes of the mobile mesh network within an operable range of the wireless communications module; and
 joining the mobile mesh network through at least one of the one or more detected mobile nodes of the mobile mesh network prior to the determining the determining data route.

13. The method of claim 11, wherein the determining the data route through the portion of the mobile mesh network comprises:
 determining a transmission characteristic estimate for each of the plurality of data routes from the wireless communications module through the mobile mesh network based on the mobile node participation variability; and
 selecting a data route from the plurality of data routes, the selected data route having a corresponding transmission characteristic estimate closest to a target transmission characteristic.

14. The method of claim 13, wherein:
 the transmission characteristic estimate comprises a probability of complete transmission of the fleet data to the target data destination, a mesh network utilization efficiency, a source node or mesh network power utilization, or a completion time of transmission; and
 the target transmission characteristic comprises the highest probability of complete transmission of the fleet data to the target data destination, a highest mesh network utilization efficiency, a lowest source node or mesh network power utilization, or a shortest or targeted completion time of transmission.

15. The method of claim 11, further comprising:
 transmitting the determined data route to the mobile mesh network to provision mobile nodes along the determined data route prior to transmitting the fleet data.

16. The method of claim 11, further comprising:
 receiving a remotely determined data route associated with at least one of the plurality of mobile nodes of the mesh network;
 provisioning the wireless communications module according to the received remotely determined data route;
 relaying remotely generated fleet data or fleet status data according to the received remotely determined data route; and
 reprovisioning the wireless communications module according to the determined data route.

17. The method of claim 11, further comprising:
 receiving fleet status data transmitted over the mobile mesh network, wherein the fleet status data comprises a fleet vehicle directive or a rider notice designated for the fleet vehicle; and
 controlling the fleet vehicle according to the received fleet vehicle directive or communicating the rider notice to the rider of the fleet vehicle via a user interface configured to receive user input from or provide user feedback to a rider of the fleet vehicle.

18. The method of claim 11, wherein:
 the fleet data comprises fleet sensor data provided by a user device or a fleet vehicle sensor configured to be physically coupled to the fleet vehicle or to provide the fleet sensor data to the wireless communications module; and
 the user device or the fleet vehicle sensor comprises a GNSS receiver configured to provide absolute positions of the fleet vehicle or the user device, an air quality sensor configured to provide an ambient air quality local to the fleet vehicle, or a camera configured to provide images of an environment in front of or about the fleet vehicle.

19. A non-transitory computer-readable medium comprising instructions that, when executed by one or more processors of a mobile mesh network provisioning system, cause the mobile mesh network provisioning system to provision a mobile mesh network comprising a plurality of mobile nodes associated with a plurality of fleet vehicles by:
 in response to determining a likely unavailability of a primary network connection for a fleet vehicle based on a planned travel path of the fleet vehicle:
  identifying, by a machine-learning model trained to identify mobile node participation variabilities for each of a plurality of data routes within the mobile mesh network based on vehicle fleet state data and vehicle fleet sensor data associated with at least one geographical area of the mobile mesh network, a mobile node participation variability for one or more data routes, wherein the mobile node participation variability comprises a likelihood that one or more of the plurality of mobile nodes will join or exit the mobile mesh network;
  determining a data route from a wireless communications module configured to be physically coupled to the fleet vehicle and through the mobile mesh network based on a target data destination and the identified mobile node participation variability, wherein the mobile mesh network comprises a secondary network connection for the fleet vehicle; and
  transmitting fleet data associated with the fleet vehicle along the determined data route via the wireless communications module.

20. The method of claim 11, further comprising:
 training the machine-learning model to identify the mobile node participation variabilities based at least in part on one or more historical data sets of vehicle fleet state data and vehicle fleet sensor data.

* * * * *